March 17, 1936.  W. A. LIPPINCOTT  2,033,946

APPARATUS FOR TRIMMING CYLINDERS

Filed Nov. 15, 1934  2 Sheets-Sheet 1

INVENTOR
Wells A. Lippincott
By Chindall, Parker & Carlson
ATTORNEYS

March 17, 1936.  W. A. LIPPINCOTT  2,033,946
APPARATUS FOR TRIMMING CYLINDERS
Filed Nov. 15, 1934   2 Sheets-Sheet 2
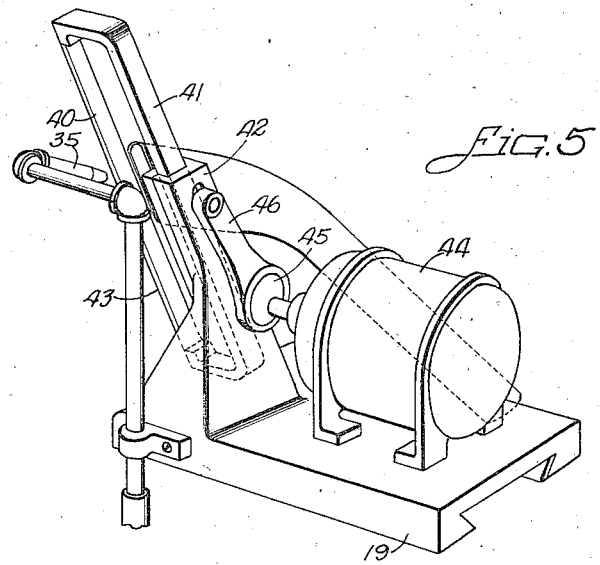
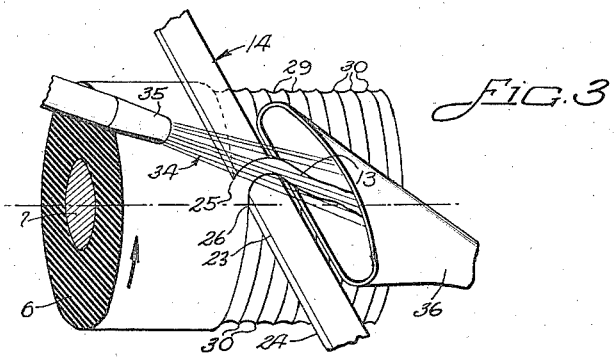
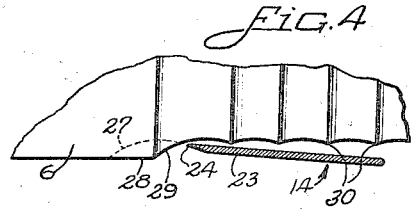
INVENTOR
Wells A. Lippincott
By Clindahl, Parker, & Carlson
ATTORNEYS Patented Mar. 17, 1936

2,033,946

UNITED STATES PATENT OFFICE 2,033,946

APPARATUS FOR TRIMMING CYLINDERS

Wells A. Lippincott, Oak Park, Ill., assignor to Ideal Roller & Manufacturing Company, Chicago, Ill., a corporation of Illinois Application November 15, 1934, Serial No. 753,083

6 Claims. (Cl. 164—69)

This invention relates generally to the formation of cylindrical surfaces on rollers such as are used in printing presses, for example, and composed of rubber or like material. In particular, the invention relates to the trimming of such rollers by cutting or slicing a ribbon-like helix from the roller periphery.

The object of the present invention is to provide a novel apparatus for reducing the diameter of a rubber cylinder in the above manner through the use of a cutting element having an elongated substantially straight knife edge.

The invention also resides in the novel manner of mounting and actuating the cutting element.

Other objects and advantages of the invention will become apparent from the following detailed description taken in connection with the accompanying drawings in which Figure 1 is a fragmentary side elevational view of a machine for trimming a rubber or similar cylinder in accordance with the present invention.

Fig. 3 is a fragmentary perspective view illustrating the cutting action.

Fig. 4 is a fragmentary plan view of a partially cut cylinder and a portion of the cutting element.

Fig. 5 is a fragmentary perspective view of a modified form of the invention.

Figure 1:
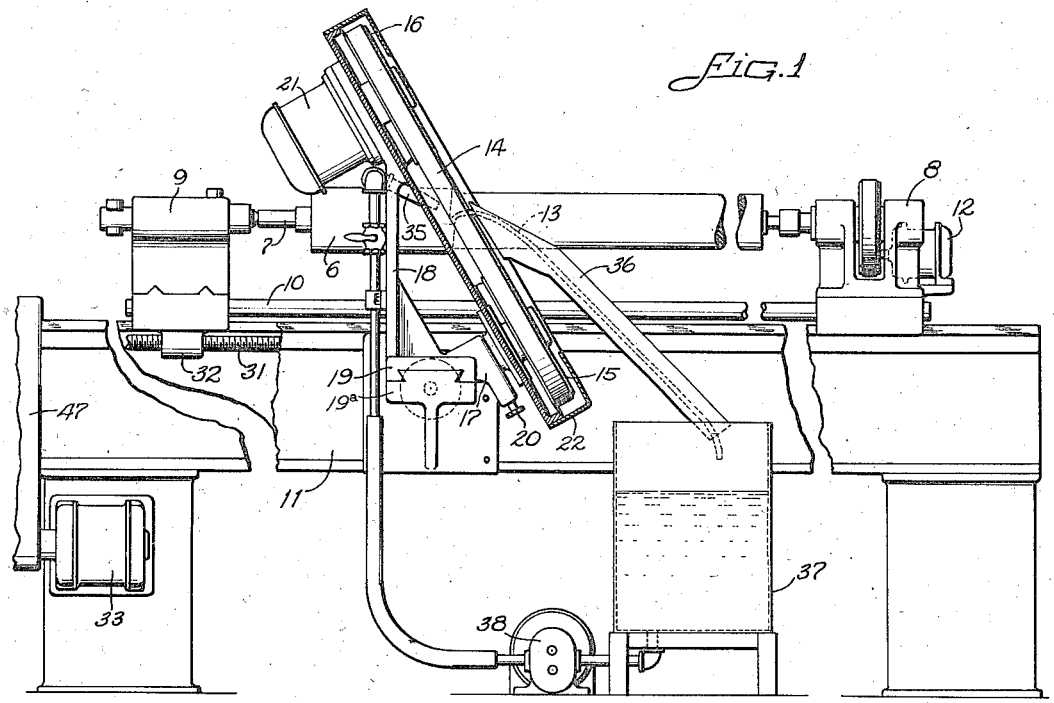
Figure 2:
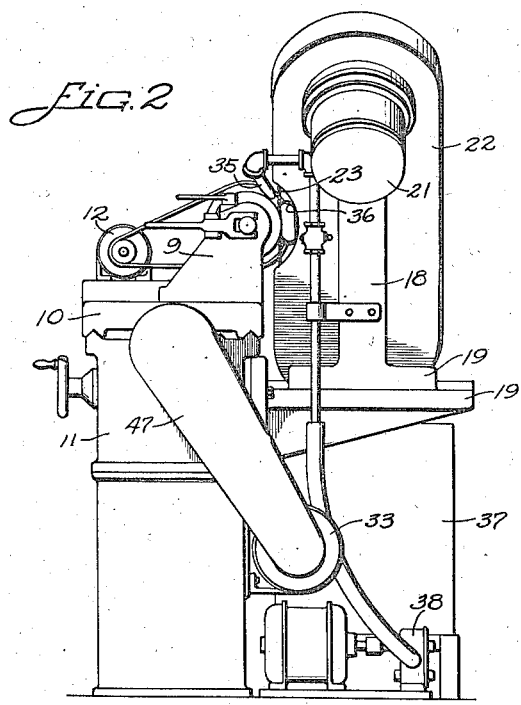
Fig. 2 is an end elevation looking from the left of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form of the invention shown in the drawings, the roller or cylinder to be trimmed comprises a sleeve 6 of substantial thickness composed of vulcanized rubber or like material carried by a shaft 7. During trimming the roller is rotated on its longitudinal axis, and for this purpose the opposite ends of the shaft 7 may be supported in conventional head and tail stocks 8 and 9 mounted on a carriage 10 which is adapted to slide longitudinally of ways on a bed 11. Rotary motion may be imparted to the cylinder by an electric motor 12 and suitable speed reduction mechanism.

Preferably, the cutting element, by which the helical ribbon 13 is sliced from the periphery of the cylinder, is in the form of an endless metallic ribbon or belt 14 extending around two pulleys 15 and 16 which are rotatably supported in spaced parallel relation upon arms 17 and 18 rigid with a cross slide 19. The latter is slidable along ways formed on a stationary part 19ª of the machine bed. The shaft of the pulley 15 is supported in the arm 17 for adjustment by a hand screw 20 so that the ribbon may be tensioned properly. The upper pulley 16 is mounted directly on the shaft of an electric motor 21 supported at the upper end of the arm 18. The pulleys and the inactive portion of the belt may be enclosed by a suitable casing 22.

The belt 14 is disposed at a substantial angle to the roller as shown in Fig. 1 with the plane of the straight portion 23 tilted slightly relative to the roller as shown in Fig. 4. One side of the belt is sharpened to form a knife edge 24 which faces downwardly. With the belt thus mounted and the cross slide 19 moved toward the roller to carry the belt portion 23 into engaging relation to the roller, a helical ribbon 13 of substantially triangular cross-section will be sliced from the periphery of the roller as the latter is rotated and the carriage 10 is advanced toward the right as viewed in Fig. 1. During the cutting, as illustrated in Fig. 3, the knife edge 24 engages the rubber between two points 25 and 26 spaced both axially and circumferentially of the cylinder periphery and respectively disposed on the untrimmed and trimmed diameters of the roller. Owing to the inclination of the knife edge, the ribbon is severed along a curved surface 27 (Fig. 4) which intersects a substantially straight uncut surface 28 and a curved surface 29 formed in the previous revolution of the roller. These sides intersect at substantial angles thereby avoiding the formation of a thin feather edge and consequent variations in the diameter to which the roller is reduced. By locating the point 26 at start of severance of the ribbon approximately at or preferably slightly above a horizontal plane through the roller axis, variations in the position of the knife edge by the camming action of the rubber thereon is avoided.

By removing a ribbon of the above character from the roller periphery, the adjacent surfaces 29 are of shallow curvature and intersect each other to leave only small ridges 30 which may be buffed off readily and the roller thus reduced to a uniform diameter. By setting the cross-slide 19 in different positions transversely of the roller, the depth of the cut taken by the knife may be varied as desired.

In the present instance, relative bodily movement between the roller and the cutting element is effected by moving the roller carriage 10. For this purpose, a screw 31 is rotatably mounted on the machine bed, threading through a nut 32 on the carriage. The screw may be rotated from an electric motor 33 operating through appropriate speed reduction mechanism within a casing 47.

To facilitate cutting of the rubber in the manner above described, a jet 34 of water is directed from a nozzle 35 in a direction transversely of the ribbon 13 adjacent the point of complete formation as shown in Fig. 3. As the ribbon is formed, the force of the jet bends the ribbon away from the roller and directs it into the open end of a trough 36 for returning the water to a tank 37 where the ribbon may accumulate. Interference of the ribbon with the cutting action is thus avoided. Water from the tank 37 is supplied to the nozzle by means of a power driven pump 38.

In the form of the invention illustrated in Fig. 5, the knife blade 40 of the reciprocatory type is employed. For this purpose, opposite ends of the blade are secured to a yoke 41 mounted for reciprocation in a guide 42 which is positioned to locate the cutting edge 43 of the blade in the same position relative to the roller as the knife edge 24 above described. The yoke 41 is arranged to be reciprocated from an electric motor 44 by suitable means such as an eccentric cam 45 having a follower 46 connected to a pin on the slidable yoke.

I claim as my invention:

1. A machine for trimming a cylinder composed of rubber or like material comprising, in combination, means supporting a cylinder for rotation on its longitudinal axis, an elongated blade having a straight knife edge extending transversely of and at an angle to the cylinder with a section of the edge entering the cylinder periphery between two points disposed on the trimmed and untrimmed diameters of the cylinder, power driven means operating to advance said blade rapidly in an endwise direction, means for rotating the cylinder in a direction to carry uncut portions of the periphery toward said edge, and means for effecting relative bodily movement between the blade and the cylinder in a direction longitudinally of the latter.

2. A machine for trimming a cylinder composed of rubber or like material comprising, in combination, means supporting a cylinder for rotation on its longitudinal axis, an elongated blade having a straight knife edge extending transversely of and at an angle to the cylinder, with a section of the edge entering the cylinder periphery between two axially and circumferentially spaced points terminating respectively on different diameters of the cylinder and disposed in the direction of rotation of the cylinder beyond a plane through the cylinder axis perpendicular to said knife edge, power driven means operating to advance said blade rapidly in an endwise direction, means for rotating the cylinder in a direction to carry uncut portions of the periphery toward said edge, and means for effecting relative bodily movement between the blade and the cylinder in a direction longitudinally of the latter.

3. A machine for trimming cylinders composed of rubber or like material comprising, in combination, means supporting a cylinder for rotation on its longitudinal axis, a frame member mounted adjacent said cylinder, said cylinder and said member being mounted for relative bodily movement in a direction longitudinally of the cylinder, two pulleys mounted on said member for rotation about parallel axes inclined relative to the cylinder, an endless metallic ribbon extending around said pulleys and having a straight elongated portion disposed adjacent the cylinder periphery with one sharpened edge engaging the cylinder periphery at axially spaced points and respectively disposed on the trimmed and untrimmed diameters of the cylinder, power driven means for rotating one of said pulleys at high speed, and power driven means for rotating the cylinder in a direction such as to carry uncut portions of the rubber toward said edge and to simultaneously effect relative movement between the roller and said frame member in a direction to carry said edge toward the uncut portion of the cylinder.

4. A machine for trimming cylinders composed of rubber or like material comprising, in combination, means supporting a cylinder for rotation on its longitudinal axis, an endless flexible knife blade disposed in a plane extending at an angle to the cylinder and having an elongated cutting edge inclined relative to the cylinder and intersecting the uncut portion thereof, said edge engaging the cylinder between points respectively disposed on the untrimmed and the trimmed diameters thereof and spaced axially of the cylinder, means for advancing the blade rapidly in an endwise direction, means for rotating the roller in a direction to carry uncut portions of the periphery toward said edge, and means for effecting relative bodily movement between the blade and the cylinder in a direction longitudinally of the latter.

5. A machine for trimming cylinders composed of rubber or like material comprising, in combination, means supporting a cylinder for rotation on its longitudinal axis, an elongated substantially flat blade inclined relative to the cylinder and disposed in a plane extending at a small angle to the cylinder and intersecting the uncut portion thereof, said blade having an elongated straight knife edge engaging the cylinder between points on different diameters spaced axially of the cylinder, means for reciprocating the blade back and forth in an endwise direction, means for rotating the cylinder in a direction to carry uncut portions of the periphery toward said edge, means for effecting relative bodily movement between the blade and the cylinder in a direction longitudinally of the latter.

6. A machine for reducing the diameter of a cylinder composed of rubber or like material comprising, in combination, means for supporting said cylinder and rotating the same on its longitudinal axis, an elongated straight knife edge mounted for endwise movement and positioned to enter the periphery of the cylinder and cut a ribbon-like helix therefrom during rotation of the cylinder and relative bodily movement between said edge and the cylinder in a direction longitudinally of the latter, and power driven means for imparting endwise movement at high speed to said knife edge.

WELLS A. LIPPINCOTT.